United States Patent
Yang et al.

(10) Patent No.: US 12,094,208 B2
(45) Date of Patent: Sep. 17, 2024

(54) VIDEO CLASSIFICATION METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Hu Yang, Beijing (CN); Feng He, Beijing (CN); Qi Wang, Beijing (CN); Zhifan Feng, Beijing (CN); Chunguang Chai, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 526 days.

(21) Appl. No.: 17/502,173

(22) Filed: Oct. 15, 2021

(65) Prior Publication Data
US 2022/0284218 A1 Sep. 8, 2022

(30) Foreign Application Priority Data
Mar. 5, 2021 (CN) .......................... 202110244368.2

(51) Int. Cl.
*G06K 9/62* (2022.01)
*G06F 18/214* (2023.01)
(Continued)

(52) U.S. Cl.
CPC ............ *G06V 20/46* (2022.01); *G06F 18/214* (2023.01); *G06F 18/241* (2023.01);
(Continued)

(58) Field of Classification Search
None
See application file for complete search history.

(56) References Cited

U.S. PATENT DOCUMENTS

| 6,363,380 B1 * | 3/2002 | Dimitrova .............. G06V 20/40 707/999.005 |
| 6,961,954 B1 * | 11/2005 | Maybury ............... G11B 27/28 725/53 |

(Continued)

FOREIGN PATENT DOCUMENTS

| CN | 109472232 A | 3/2019 |
| CN | 110012349 A | 7/2019 |

(Continued)

OTHER PUBLICATIONS

Lienhart et al., "Scene determination based on video and audio features," Proceedings IEEE International Conference on Multimedia Computing and Systems, Florence, Italy, 1999, pp. 685-690 vol. 1 (Year: 1999).*

(Continued)

*Primary Examiner* — Feng Niu
(74) *Attorney, Agent, or Firm* — Brooks Kushman P.C.

(57) ABSTRACT

The present disclosure discloses a video classification method, an electronic device and a storage medium, and relates to the field of computer technologies, and particularly to the field of artificial intelligence technologies, such as knowledge graph technologies, computer vision technologies, deep learning technologies, or the like. The video classification method includes: extracting a keyword in a video according to multi-modal information of the video; acquiring background knowledge corresponding to the keyword, and determining a text to be recognized according to the keyword and the background knowledge; and classifying the text to be recognized to obtain a class of the video.

16 Claims, 5 Drawing Sheets

(51) Int. Cl.
*G06F 18/241* (2023.01)
*G06F 18/25* (2023.01)
*G06N 20/00* (2019.01)
*G06V 10/22* (2022.01)
*G06V 10/40* (2022.01)
*G06V 10/70* (2022.01)
*G06V 10/764* (2022.01)
*G06V 10/80* (2022.01)
*G06V 10/82* (2022.01)
*G06V 20/40* (2022.01)
*G06V 20/62* (2022.01)
*G06V 20/70* (2022.01)
*G10L 15/08* (2006.01)
*G06N 3/08* (2023.01)
*G06V 30/10* (2022.01)

(52) U.S. Cl.
CPC ......... *G06F 18/253* (2023.01); *G06N 20/00* (2019.01); *G06V 10/22* (2022.01); *G06V 10/40* (2022.01); *G06V 10/764* (2022.01); *G06V 10/768* (2022.01); *G06V 10/806* (2022.01); *G06V 10/82* (2022.01); *G06V 20/41* (2022.01); *G06V 20/635* (2022.01); *G06V 20/70* (2022.01); *G10L 15/08* (2013.01); *G06N 3/08* (2013.01); *G06V 30/10* (2022.01)

(56) References Cited

U.S. PATENT DOCUMENTS

| | | | |
|---|---|---|---|
| 7,512,273 B2* | 3/2009 | Szummer | G06F 18/21 382/163 |
| 7,765,574 B1* | 7/2010 | Maybury | G06F 16/785 725/50 |
| 9,253,511 B2* | 2/2016 | Chen | H04N 21/233 |
| 9,443,147 B2* | 9/2016 | Mei | H04N 21/4722 |
| 9,916,522 B2* | 3/2018 | Ros Sanchez | G06N 3/08 |
| 10,445,582 B2* | 10/2019 | Mehrseresht | G06V 20/49 |
| 10,635,927 B2* | 4/2020 | Chen | G06V 10/82 |
| 10,887,640 B2* | 1/2021 | Swaminathan | H04N 21/8549 |
| 11,017,173 B1* | 5/2021 | Lu | G06N 3/045 |
| 11,244,119 B1* | 2/2022 | Tao | G06F 18/253 |
| 11,494,647 B2* | 11/2022 | Pouran Ben Veyseh | G06N 20/20 |
| 11,716,347 B2* | 8/2023 | Boyer | G06F 18/23 726/23 |
| 11,741,711 B2* | 8/2023 | Ma | G06V 20/41 382/224 |
| 2006/0098871 A1* | 5/2006 | Szummer | G06V 30/1988 382/173 |
| 2014/0201180 A1 | 7/2014 | Fatourechi et al. | |
| 2015/0293928 A1* | 10/2015 | Chen | G06F 16/738 707/738 |
| 2015/0293995 A1* | 10/2015 | Chen | H04N 21/237 707/706 |
| 2015/0296228 A1* | 10/2015 | Chen | H04N 21/8126 725/34 |
| 2016/0014482 A1 | 1/2016 | Chen et al. | |
| 2017/0262735 A1* | 9/2017 | Ros Sanchez | G06T 7/10 |
| 2018/0032845 A1 | 2/2018 | Polak et al. | |
| 2018/0129944 A1* | 5/2018 | Meunier | G06N 20/00 |
| 2018/0173955 A1* | 6/2018 | Mehrseresht | G06F 18/24137 |
| 2018/0253622 A1* | 9/2018 | Chen | G06N 3/08 |
| 2019/0384981 A1* | 12/2019 | Swaminathan | G06F 18/2431 |
| 2020/0021873 A1* | 1/2020 | Swaminathan | H04N 21/466 |
| 2021/0174152 A1* | 6/2021 | Ma | G06V 10/454 |
| 2021/0174193 A1* | 6/2021 | Pouran Ben Veyseh | G06F 18/253 |
| 2021/0256051 A1 | 8/2021 | Wang et al. | |
| 2021/0256213 A1* | 8/2021 | Lu | G06N 3/08 |
| 2022/0132179 A1* | 4/2022 | Bennett-James | G06V 40/20 |
| 2022/0222920 A1* | 7/2022 | Huang | G06V 10/76 |

FOREIGN PATENT DOCUMENTS

| | | | | |
|---|---|---|---|---|
| CN | 110362684 A | 10/2019 | | |
| CN | 110516654 A | 11/2019 | | |
| CN | 110879974 A | 3/2020 | | |
| CN | 111259215 A | 6/2020 | | |
| CN | 112256917 A | 1/2021 | | |
| JP | 2007294020 A | 11/2007 | | |
| WO | WO-2007114796 A1 * | 10/2007 | | G06K 9/00711 |

OTHER PUBLICATIONS

Peng et al., "Keyframe-Based Video Summary Using Visual Attention Clues," in IEEE MultiMedia, vol. 17, No. 2, pp. 64-73, Apr.-Jun. 2010 (Year: 2010).*

Extended European Search Report of European application No. 21201377.5 dated Mar. 21, 2022, 7 pages.

Ji, Research on News Video Content Analysis Based on Multimodality Information, Chinese Doctoral Dissertations & Master's Theses Full-text Database, Jun. 2009, 12 pages.

Zheng et al., TV Commercial Classification by Using Multi-Modal Textual Information, ICME 2006, pp. 497-500.

* cited by examiner

VIDEO CLASSIFICATION METHOD, ELECTRONIC DEVICE AND STORAGE MEDIUM

CROSS-REFERENCE TO RELATED APPLICATIONS

The present application claims the priority of Chinese Patent Application No. 202110244368.2, filed on Mar. 5, 2021, with the title of "Video classification method and apparatus, device and storage medium." The disclosure of the above application is incorporated herein by reference in its entirety.

TECHNICAL FIELD

The present disclosure relates to the field of computer technologies, and particularly relates to the field of artificial intelligence technologies, such as knowledge graph technologies, computer vision technologies, deep learning technologies, or the like, and particularly to a video classification method, an electronic device and a storage medium.

BACKGROUND

Artificial intelligence (AI) is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the AI include technologies, such as a sensor, a dedicated artificial intelligence chip, cloud computing, distributed storage, big data processing, or the like; the software technologies of the AI mainly include a computer vision technology, a voice recognition technology, a natural language processing technology, a machine learning/deep learning technology, a big data processing technology, a knowledge graph technology, or the like.

With a development of an information technology, videos become one of the main ways to carry information for transfer. As video data grows rapidly, the videos may be classified, so as to be stored, managed, or the like, based on classes.

SUMMARY

The present disclosure provides a video classification method, an electronic device and a storage medium.

According to an aspect of the present disclosure, there is provided a video classification method, including: extracting a keyword in a video according to multi-modal information of the video; acquiring background knowledge corresponding to the keyword, and determining a text to be recognized according to the keyword and the background knowledge; and classifying the text to be recognized to obtain a class of the video.

According to another aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform video classification method, wherein video classification method includes: extracting a keyword in a video according to multi-modal information of the video; acquiring background knowledge corresponding to the keyword, and determining a text to be recognized according to the keyword and the background knowledge; and classifying the text to be recognized to obtain a class of the video.

According to another aspect of the present disclosure, there is provided a non-transitory computer readable storage medium with computer instructions stored thereon, wherein the computer instructions are used for causing a computer to perform a video classification method, wherein the video classification method includes: extracting a keyword in a video according to multi-modal information of the video; acquiring background knowledge corresponding to the keyword, and determining a text to be recognized according to the keyword and the background knowledge; and classifying the text to be recognized to obtain a class of the video.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure, wherein.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Figure 1:
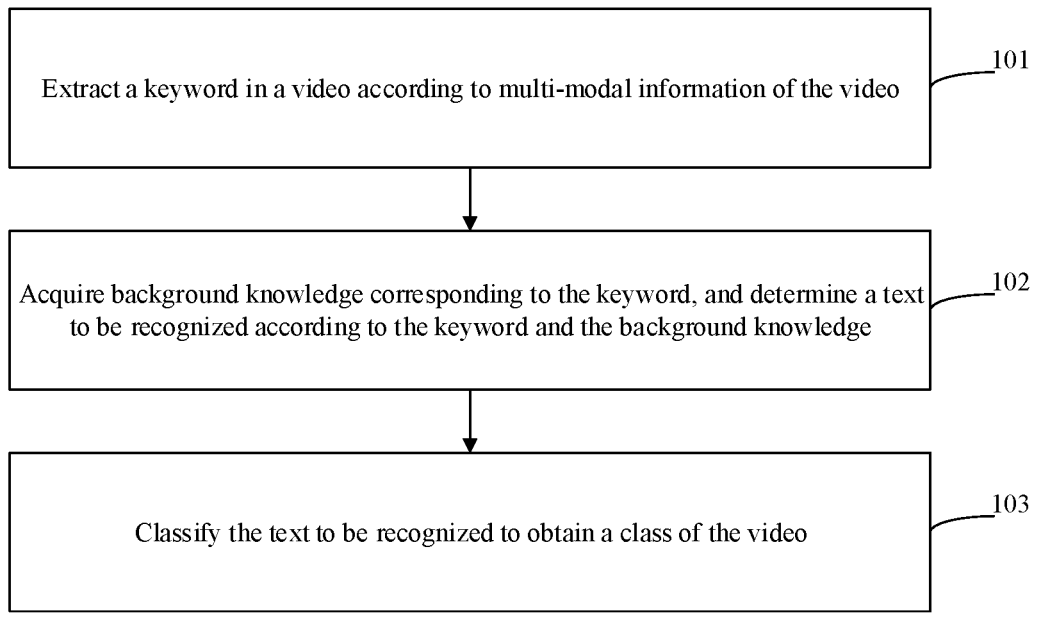
FIG. 1 is a schematic diagram according to a first embodiment of the present disclosure.

FIG. 1 is a schematic diagram according to a first embodiment of the present disclosure. The present embodiment provides a video classification method, including:

101: extracting a keyword in a video according to multi-modal information of the video;

102: acquiring background knowledge corresponding to the keyword, and determining a text to be recognized according to the keyword and the background knowledge; and

103: classifying the text to be recognized to obtain a class of the video.

A single-side device body, such as a server, may serve as a subject for executing the present embodiment.

In the embodiment of the present disclosure, a "modal" refers to a form of information in the video, such as a text, vision, a speech, or the like. The multi-modal information refers to various forms of information, and specifically, in the present embodiment, the multi-modal information includes: text content and visual information; that is, one kind of modal information is text content, and the other kind of modal information is visual information. The text content refers to specific content of a text; for example, if there exists a text about rural e-commerce, the corresponding text content may include "rural e-commerce", or the like. In addition to the text content, the text may also include other information, such as a text position, a font size of the text, or the like, which may be one kind of visual information.

Further, the text may include: a title of the video, an optical character recognition (OCR) text, and an automatic speech recognition (ASR) text. The title refers to a generalized caption of the video; for example, on a video page of a certain video website, a corresponding caption may be configured corresponding to each video, and may serve as the title of the video. The text content corresponding to the title may be directly acquired by parsing the video page. The video is composed of a plurality of video frames, and the OCR text refers to a text in the video frame obtained by means of OCR. Different from the text content corresponding to the title which may be acquired directly, the text content corresponding to the OCR text is required to be acquired by means of OCR. The ASR text refers to a text obtained by performing speech recognition on the speech corresponding to the video by means of ASR. The text content corresponding to the ASR text is also unable to be acquired directly, and required to be acquired by means of ASR.

The visual information may include first visual information and second visual information, the first visual information may also be referred to as microscopic visual information, and the second visual information may also be referred to as macroscopic visual information. The first visual information refers to visual information corresponding to the text in the video frame, the text in the video frame is, for example, the above-mentioned OCR text, and the first visual information includes, for example: one or more of a position of the OCR text, a font of the OCR text, duration of the OCR text, or the like. The second visual information refers to a key frame in the video, and the key frame refers to a video frame containing specific information, and specifically, the specific information includes, for example, one or more of the OCR text, a face image, or the like.

After acquisition of the multi-modal information, feature extraction may be performed on each piece of modal information in the multi-modal information, so as to obtain a feature corresponding to each piece of modal information. For example, if the multi-modal information includes the text and the visual information, a text feature corresponding to the text and a visual feature corresponding to the visual information may be extracted respectively. Then, the text feature and the visual feature are fused to obtain a fused feature, and the keyword is labeled according to the fused feature to determine the keyword in the video.

By fusing the features corresponding to each piece of modal information, the fused feature may contain the multi-modal information, thus improving classification accuracy.

After acquisition of the keyword in the video, the corresponding background knowledge may be acquired, the background knowledge referring to content for interpreting and explaining the keyword. Specifically, the background knowledge corresponding to the keyword may be acquired in an existing knowledge base. The existing knowledge base may store each keyword and corresponding background knowledge. The existing knowledge base is, for example, Baidu Baike.

After acquisition of the background knowledge, the keyword and the background knowledge may be stitched to obtain a stitched text, and then, the stitched text is classified to determine the class of the video.

In the present embodiment, by performing the processing operation based on the multi-modal information, the characteristic that the video has the multi-modal information may be fully utilized to improve the video classification accuracy. By acquiring the background knowledge corresponding to the keyword and performing the processing operation based on the background knowledge, the knowledge of the keyword may be supplemented, such that the text to be recognized has a higher interpretability, thereby further improving the video classification accuracy.

Figure 2:
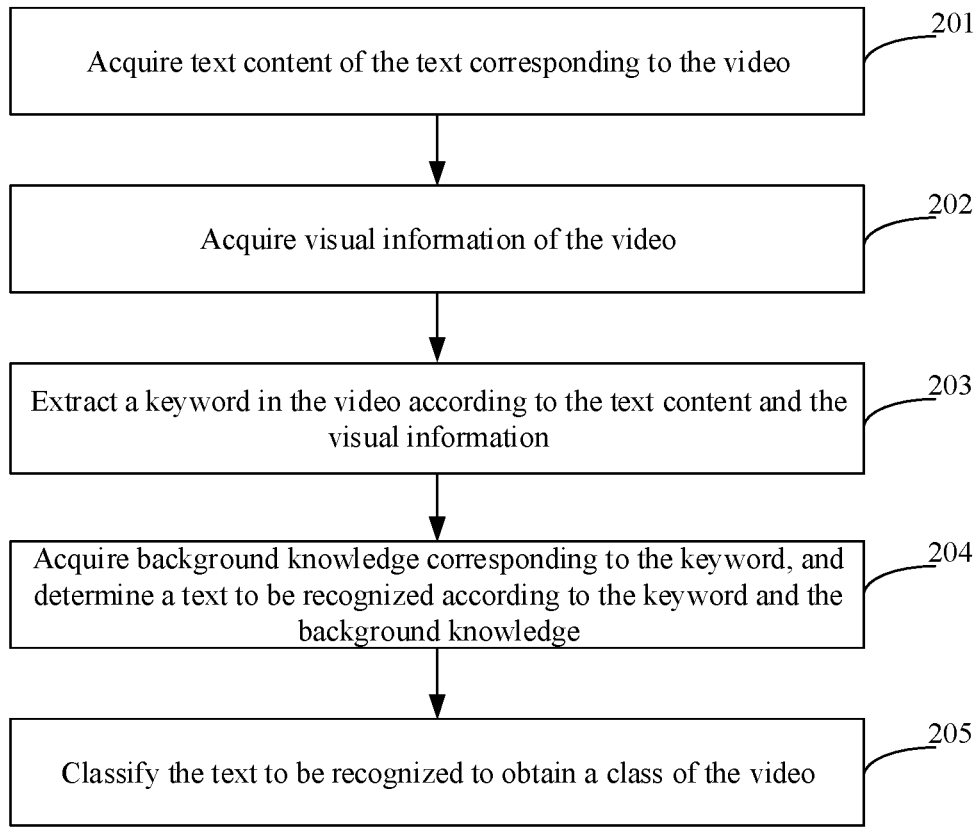
FIG. 2 is a schematic diagram according to a second embodiment of the present disclosure.

FIG. 2 is a schematic diagram according to a second embodiment of the present disclosure, the present embodiment provides a video classification method, and takes a multi-modal feature of a video including a text and a visual feature as an example, and the method includes:

201: acquiring text content of the text corresponding to the video.

The text includes: a title of the video, an OCR text, and an ASR text.

The text content corresponding to the title may be extracted directly, such that text parse may be performed on a video web page, so as to directly acquire the text content corresponding to the title of the video.

Figure 3:
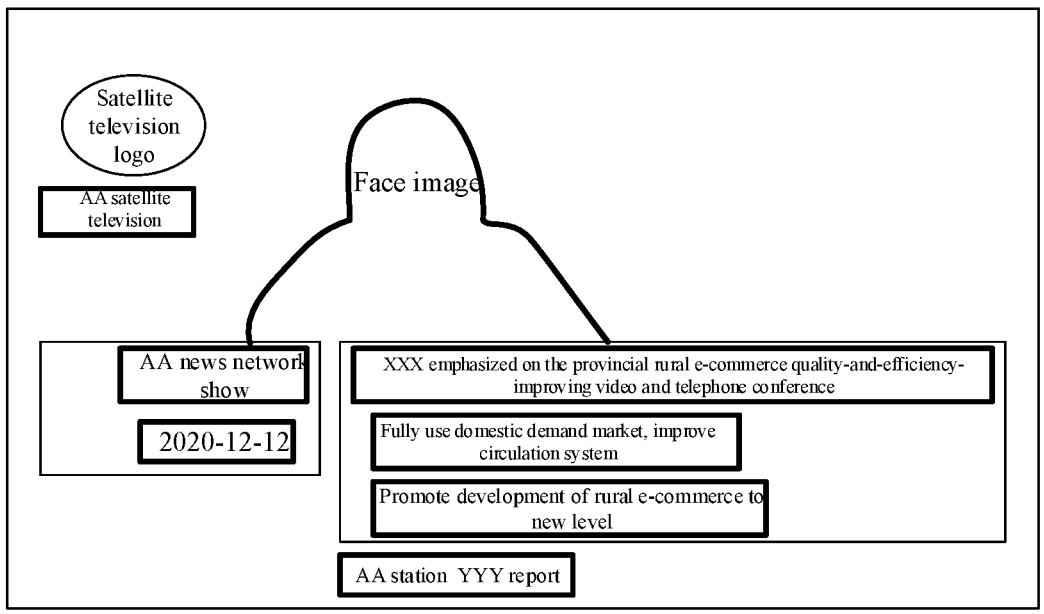
FIG. 3 is a schematic diagram according to a third embodiment of the present disclosure.

The OCR text refers to a text in a video frame obtained by processing the video frame using OCR. As shown in FIG. 3, the text in a certain video frame is identified by a corresponding text box, and after image content in the text box is recognized by means of OCR, the corresponding text content may be obtained. For example, the text content corresponding to one OCR text is "XXX emphasized on the provincial rural e-commerce quality-and-efficiency-improving video and telephone conference".

The ASR text is obtained by converting a speech corresponding to the video using a speech recognition technology; for example, for the video frame shown in FIG. 3, there may also exist a speech of a corresponding newscaster while the video frame is played, and the speech may be converted into corresponding text content as the text content corresponding to the ASR text.

202: acquiring visual information of the video.

The visual information includes first visual information and second visual information, the first visual information is visual information corresponding to the text in the video frame in the video, and the second visual information is a key frame in the video. Specifically, the first visual information includes, for example: one or more of a position of the OCR text, a font of the OCR text, duration of the OCR text, or the like. The second visual information is, for example, a video frame containing specific information, and the specific information includes, for example, one or more of the OCR text, a face image, or the like. For example, the position of the OCR text "XXX emphasized on the provincial rural e-commerce quality-and-efficiency-improving video and telephone conference" in FIG. 3 may be used as one kind of first visual information, and since the video frame shown in FIG. 3 includes the OCR text as well as a face image, the video frame may be used as the key frame, i.e., the second visual information.

203: extracting a keyword in the video according to the text content and the visual information.

Figure 4:
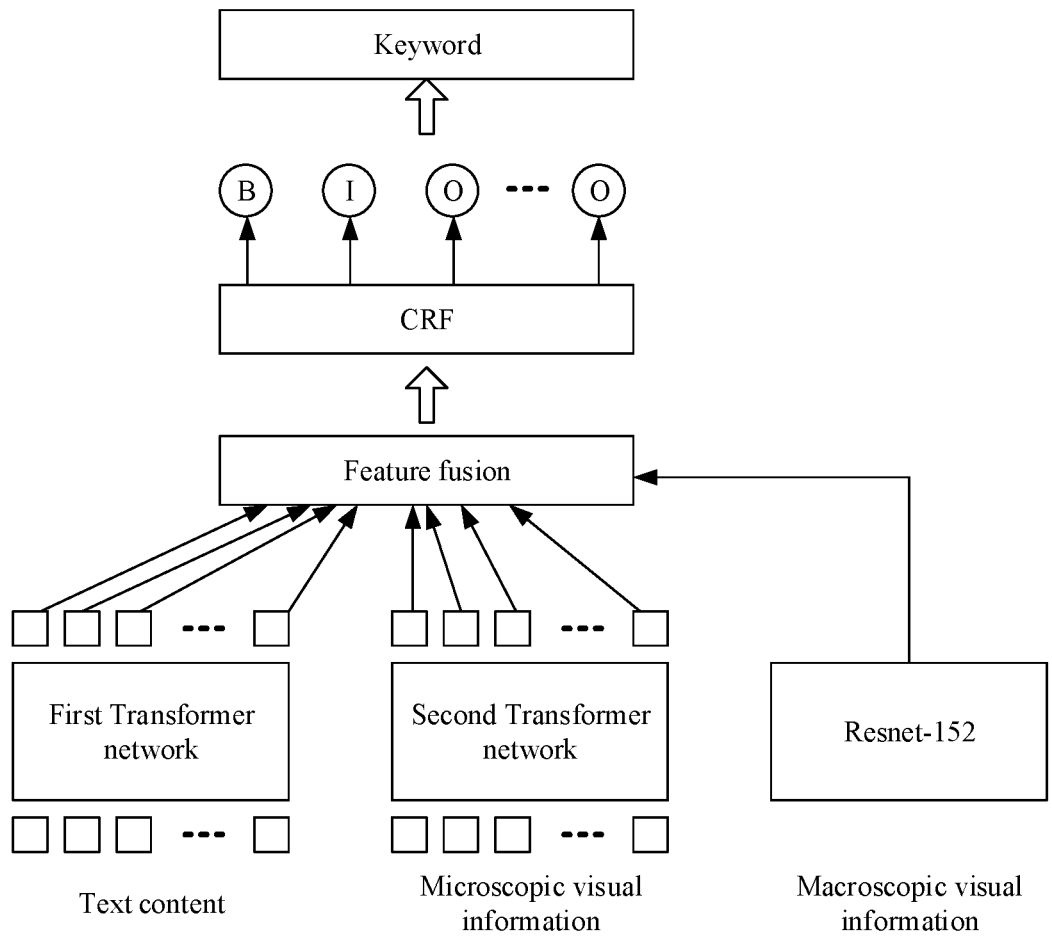
FIG. 4 is a schematic diagram according to a fourth embodiment of the present disclosure.

Specifically, as shown in FIG. 4, feature extraction may be performed on the text content and the visual information respectively to obtain a text feature and a visual feature.

Further, the visual information may be divided into the first visual information and the second visual information, and feature extraction may be performed on the first visual information and the second visual information respectively, so as to obtain a first visual feature and a second visual feature.

Specifically, since both the text content and the first visual information belong to text forms, the text content and the first visual information may be converted into corresponding feature vectors by extracting the text feature. Since the second visual information is the key frame which is an image, the second visual information may be converted into a corresponding feature vector by extracting an image feature. That is, this process may include: performing a first text encoding operation on the text content to obtain the text feature; performing a second text encoding operation on the first visual information to obtain the first visual feature; and performing an image encoding operation on the second visual information to obtain the second visual feature.

By encoding different modal information respectively, each piece of modal information may be processed in a more suitable encoding mode, so as to improve accuracy of the feature corresponding to each piece of modal information, thereby improving classification accuracy.

As shown in FIG. 4, the text content may be encoded using a first text encoding model to obtain the text feature, the first visual information may be encoded using a second text encoding model to obtain the first visual feature, and the second visual information may be encoded using an image encoding model to obtain the second visual feature. The first text encoding model and/or the second text encoding model are/is configured as, for example, encoders/an encoder in a Transformer network (represented in FIG. 4 as a first Transformer network and a second Transformer network respectively). The image encoding model is configured as, for example, a convolutional neural network (CNN), specifically, resnet-152.

It may be understood that text encoding output is in a vector form, and for the image encoding operation, an extracted feature map may be flattened and converted into a vector form, such that the text feature, the first visual feature, and the second visual feature are all in the vector form.

After obtained, the text feature, the first visual feature and the second visual feature may be fused; specifically, since the three features are in the vector form, a vector stitching operation may be performed on the three features to obtain a stitched vector as a fused feature.

By using the vector stitching mode for fusion, the multimodal information may be simply fused conveniently.

After the fused vector is obtained, the keyword may be labeled according to the fused feature using a conditional random field (CPF), so as to obtain the keyword in the video. As shown in FIG. 4, for example, words may be labeled with B, I and O, B represents a starting point of the keyword, I represents other parts of the keyword, and O represents parts which do not belong to the keyword, such that the keyword in the video may be obtained by the keyword labeling operation. For example, for the above-mentioned "XXX emphasized on the provincial rural e-commerce quality-and-efficiency-improving video and telephone conference", after the keyword labeling operation, "rural" and "e-commerce" are labeled with B and I respectively, the rest words are all labeled with O, and then, the extracted keyword is "rural e-commerce".

Feature fusion may be performed for each word; for example, the text content includes "word1", "word2", or the like, and the first visual information corresponding to "word1" is represented by feat1, such that the first visual information includes "feat1", "feat2", or the like, and therefore, in fusion, taking "word1" as an example, the text feature corresponding to "word1", the first visual feature corresponding to "feat1" and the second visual feature are stitched as the fused feature corresponding to "word1". In addition, a feature corresponding to [CLS] may or may not be included during fusion. Taking the first Transformer network in FIG. 4 as an example, input boxes include: [CLS], "word1", "word2", or the like, and output boxes include: text features H0, H1, H2, or the like, H0 being a hidden layer output vector corresponding to [CLS], H1 being a hidden layer output vector corresponding to "word1", and H2 being a hidden layer output vector corresponding to "word2". The second Transformer network has similar input boxes and output boxes, except that input is the visual information and output is the visual feature. Since the vector stitching operation is based on words, the fused feature has a unit of the word in the text content, and the words may be labeled with the above B, I and O one by one in the keyword labeling operation to determine the keyword.

The fused feature is labeled using CRF, such that the keyword in the video may be extracted based on the keyword labeling mode.

204: acquiring background knowledge corresponding to the keyword, and determining a text to be recognized according to the keyword and the background knowledge.

For example, the background knowledge corresponding to the keyword is acquired from Baidu Baike. For example, for the video frame shown in FIG. 3, the extracted keyword is "rural e-commerce", and the background knowledge corresponding to "rural e-commerce" may be found in Baidu Baike: "A rural e-commerce platform is matched with dense rural chain networks, so as to construct a compact and ordered business union by means of digitization and informatization by intensive management, marketization operation and systematic cross-region and cross-industry cooperation, thus reducing a rural commerce cost, expanding a rural commerce field, making farmers become the greatest beneficiary of the platform, and making merchants obtain new profit increases".

Since a large number of data resources in various aspects exist in the knowledge base, the existing resources may be fully utilized by acquiring the background knowledge from the knowledge base.

Then, the keyword and the background knowledge may be stitched to obtain a spliced text as a text to be recognized.

It may be understood that if there exist a plurality of extracted keywords in the video, each keyword and the background knowledge may be stitched correspondingly, and then, all the keywords are stitched. For example, a first keyword+first background knowledge+a second keyword+second background knowledge+a third keyword+third background knowledge, or the like, wherein "+" represents the stitching operation.

205: classifying the text to be recognized to obtain a class of the video.

Figure 5:
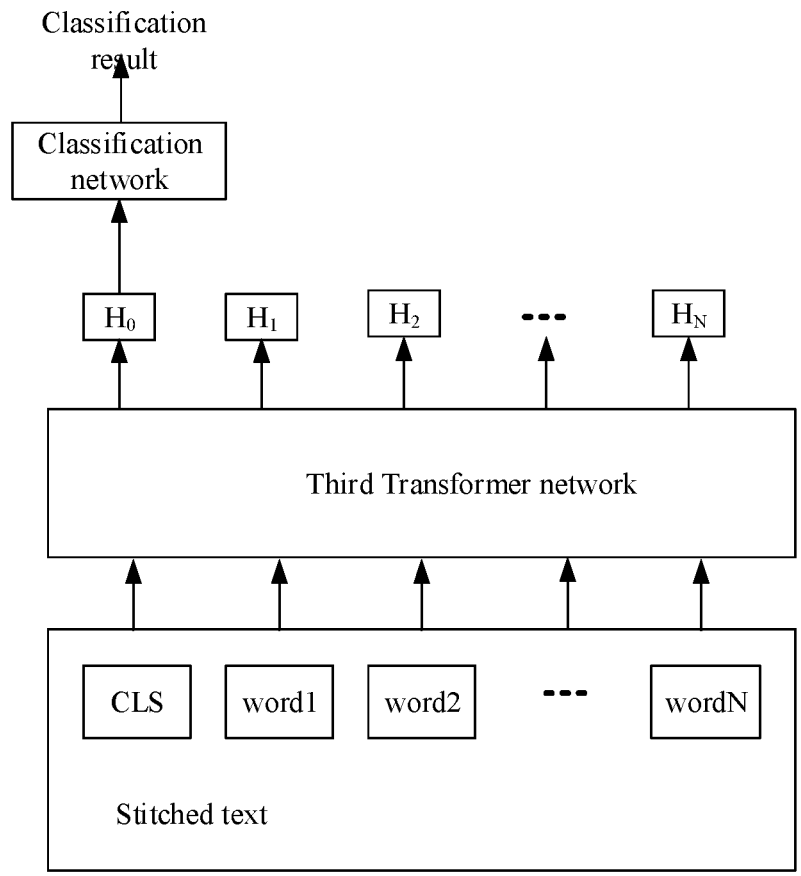
FIG. 5 is a schematic diagram according to a fifth embodiment of the present disclosure.

The text to be recognized may be input into a classification model, and output is the class of the video. The classification model includes, for example, a text encoding network and a classification network. As shown in FIG. 5, the text encoding network may be configured as an encoder of a Transformer network, which is represented by the third Transformer network in FIG. 5; for example, the text to be recognized may be divided into a plurality of words which are represented by "word1", "word2", or the like, the obtained plural words and a classification identifier "[CLS]" are input into the text encoding network, and output includes hidden layer vectors H0, H1, H2, or the like, H0 being the hidden layer vector corresponding to [CLS]; H0 is used as input into the classification network, and output is a classification result, i.e., the class of the video. The classification network may be configured as various existing classification networks, and includes, for example, a fully connected layer.

Further, the classification model may be obtained after trained using broadcast television data; that is, the broadcast television data serves as training data for training the classification model. The broadcast television data includes broadcast television video data and corresponding video labels, and the video label may be used for a labeling operation according to a broadcast-television video classification standard. The broadcast-television video classification standard is the Classification of Audio-Visual Materials on Broadcast Television. The Classification of Audio-Visual Materials on Broadcast Television is the most authoritative classification system for Chinese television broadcast programs and other programs. The classification system has a tree structure, and is divided into 13 main classes, and generally subdivided into 3 to 4 levels. Television broadcast programs, such as television programs, movies, variety shows, cartoons, news, or the like, which are propagated on the Internet may be classified according to the authoritative classification system. Videos are also required to be classified according to the classification standard when video content is cataloged in regular television stations. It may be understood that the video labels may be adopted according to actual requirements; for example, if subdivision into a class of level 2 is required, labels of level 2 may be used as the video labels in the training process.

The classification model obtained after trained using the broadcast television data conforms to the standard, has an authority and a standard performance, and may thus have an improved universality.

Figure 6:
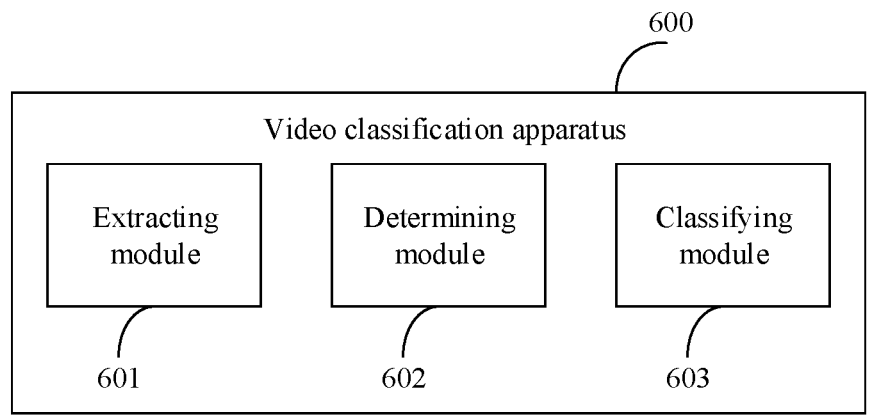
FIG. 6 is a schematic diagram according to a sixth embodiment of the present disclosure.

FIG. 6 is a schematic diagram according to a sixth embodiment of the present disclosure, the present embodiment provides a video classification apparatus, and the apparatus 600 includes an extracting module 601, a determining module 602 and a classifying module 603.

The extracting module 601 is configured to extract a keyword in a video according to multi-modal information of the video; the determining module 602 is configured to acquire background knowledge corresponding to the keyword, and determine a text to be recognized according to the keyword and the background knowledge; and the classifying module 603 is configured to classify the text to be recognized to obtain a class of the video.

In some embodiments, the extracting module 601 is specifically configured to: perform feature extraction on each piece of modal information in the multi-modal information, so as to obtain features corresponding to each piece of modal information; fuse the features corresponding to each piece of modal information to obtain a fused feature; and label the keyword according to the fused feature to determine the keyword in the video.

In some embodiments, the multi-modal information includes text content and visual information, the visual information includes first visual information and second visual information, the first visual information is visual information corresponding to a text in a video frame in the video, the second visual information is a key frame in the video, and the extracting module 601 is further specifically configured to: perform a first text encoding operation on the text content to obtain a text feature; perform a second text encoding operation on the first visual information to obtain a first visual feature; and perform an image encoding operation on the second visual information to obtain a second visual feature.

In some embodiments, the extracting module 601 is further specifically configured to: perform a vector stitching operation on the features corresponding to each piece of modal information, so as to obtain a stitched vector as the fused feature.

In some embodiments, the extracting module 601 is further specifically configured to: label the keyword according to the fused feature using a conditional random field.

In some embodiments, the determining module 602 is specifically configured to: acquire the background knowledge corresponding to the keyword from an existing knowledge base.

In some embodiments, the classifying module 603 is specifically configured to: classify the text to be recognized using a classification model, the classification model being obtained after trained using broadcast television data.

In the present embodiment, by performing the processing operation based on the multi-modal information, the characteristic that the video has the multi-modal information may be fully utilized to improve the video classification accuracy. By acquiring the background knowledge corresponding to the keyword and performing the processing operation based on the background knowledge, the knowledge of the keyword may be supplemented, such that the text to be recognized has a higher interpretability, thereby further improving the video classification accuracy. By encoding different modal information respectively, each piece of modal information may be processed in a more suitable encoding mode, so as to improve accuracy of the feature corresponding to each piece of modal information, thereby improving the classification accuracy. By using the vector stitching mode for fusion, the multi-modal information may be simply fused conveniently. The fused feature is labeled using CRF, such that the keyword in the video may be extracted based on the keyword labeling mode. Since a large number of data resources in various aspects exist in the knowledge base, the existing resources may be fully utilized by acquiring the background knowledge from the knowledge base. The classification model obtained after trained using the broadcast television data conforms to the standard, has an authority and a standard performance, and may thus have an improved universality.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

According to the embodiment of the present disclosure, there are also provided an electronic device, a readable storage medium and a computer program product.

Figure 7:
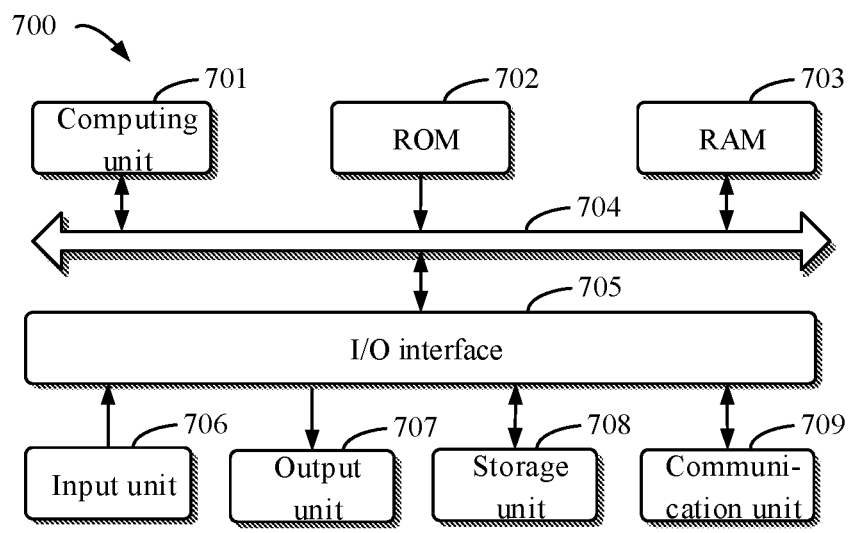
FIG. 7 is a schematic diagram of an electronic device configured to implement any of video classification methods according to the embodiments of the present disclosure.

FIG. 7 shows a schematic block diagram of an exemplary electronic device 700 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 8, the electronic device 700 includes a computing unit 701 which may perform various appropriate actions and processing operations according to a computer program stored in a read only memory (ROM) 702 or a computer program loaded from a storage unit 708 into a random access memory (RAM) 703. Various programs and data necessary for the operation of the electronic device 700 may be also stored in the RAM 703. The computing unit 701, the ROM 702, and the RAM 703 are connected with one other through a bus 704. An input/output (I/O) interface 705 is also connected to the bus 704.

The plural components in the electronic device 700 are connected to the I/O interface 705, and include: an input unit 706, such as a keyboard, a mouse, or the like; an output unit 707, such as various types of displays, speakers, or the like; the storage unit 708, such as a magnetic disk, an optical disk, or the like; and a communication unit 709, such as a network card, a modem, a wireless communication transceiver, or the like. The communication unit 709 allows the electronic device 700 to exchange information/data with other devices through a computer network, such as the Internet, and/or various telecommunication networks.

The computing unit 701 may be a variety of general and/or special purpose processing components with processing and computing capabilities. Some examples of the computing unit 701 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 701 performs the methods and processing operations described above, such as the video classification method. For example, in some embodiments, the video classification method may be implemented as a computer software program tangibly contained in a machine readable medium, such as the storage unit 708. In some embodiments, part or all of the computer program may be loaded and/or installed into the electronic device 700 via the ROM 702 and/or the communication unit 709. When the computer program is loaded into the RAM 703 and executed by the computing unit 701, one or more steps of the video classification method described above may be performed. Alternatively, in other embodiments, the computing unit 701 may be configured to perform the video classification method by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A video classification method, comprising:
    extracting a keyword in a video according to multi-modal information of the video;
    acquiring background knowledge corresponding to the keyword, and determining a text to be recognized according to the keyword and the background knowledge; and
    classifying the text to be recognized to obtain a class of the video,
    wherein the extracting a keyword in a video according to multi-modal information of the video comprises:
        performing feature extraction on each piece of modal information in the multi-modal information, so as to obtain features corresponding to each piece of modal information;
        fusing the features corresponding to each piece of modal information to obtain a fused feature; and
        performing a word labeling according to the fused feature in the video to determine the keyword in the video,
    wherein the multi-modal information comprises text content and visual information, the visual information comprises first visual information and second visual information, the first visual information is visual information corresponding to a text in a video frame in the video, the second visual information is a key frame in the video, and the performing feature extraction on each piece of modal information in the multi-modal information, so as to obtain features corresponding to each piece of modal information comprises:
        performing a first text encoding operation on the text content to obtain a text feature;
        performing a second text encoding operation on the first visual information to obtain a first visual feature; and
        performing an image encoding operation on the second visual information to obtain a second visual feature.

2. The method according to claim 1, wherein the fusing the features corresponding to each piece of modal information to obtain a fused feature comprises:
    performing a vector stitching operation on the features corresponding to each piece of modal information, so as to obtain a stitched vector as the fused feature.

3. The method according to claim 1, wherein the labeling the keyword according to the fused feature comprises:
    labeling the keyword according to the fused feature using a conditional random field.

4. The method according to claim 1, wherein the acquiring background knowledge corresponding to the keyword comprises:
    acquiring the background knowledge corresponding to the keyword from an existing knowledge base.

5. The method according to claim 1, wherein the classifying the text to be recognized comprises:
    classifying the text to be recognized using a classification model, the classification model being obtained after trained using broadcast television data.

6. The method according to claim 1, wherein the classifying the text to be recognized comprises:
    classifying the text to be recognized using a classification model, the classification model being obtained after trained using broadcast television data.

7. The method according to claim 1, wherein the classifying the text to be recognized comprises:
    classifying the text to be recognized using a classification model, the classification model being obtained after trained using broadcast television data.

8. The method according to claim 2, wherein the classifying the text to be recognized comprises:
    classifying the text to be recognized using a classification model, the classification model being obtained after trained using broadcast television data.

9. The method according to claim 3, wherein the classifying the text to be recognized comprises:
    classifying the text to be recognized using a classification model, the classification model being obtained after trained using broadcast television data.

10. The method according to claim 4, wherein the classifying the text to be recognized comprises:
    classifying the text to be recognized using a classification model, the classification model being obtained after trained using broadcast television data.

11. An electronic device, comprising:
    at least one processor; and
    a memory communicatively connected with the at least one processor;
    wherein the memory stores instructions executable by the at least one processor, and the instructions are executed by the at least one processor to enable the at least one processor to perform video classification method, wherein video classification method comprises:
    extracting a keyword in a video according to multi-modal information of the video;
    acquiring background knowledge corresponding to the keyword, and determining a text to be recognized according to the keyword and the background knowledge; and
    classifying the text to be recognized to obtain a class of the video,
    wherein the extracting a keyword in a video according to multi-modal information of the video comprises:

performing feature extraction on each piece of modal information in the multi-modal information, so as to obtain features corresponding to each piece of modal information;

fusing the features corresponding to each piece of modal information to obtain a fused feature; and performing a word labeling according to the fused feature in the video to determine the keyword in the video, wherein the multi-modal information comprises text content and visual information, the visual information comprises first visual information and second visual information, the first visual information is visual information corresponding to a text in a video frame in the video, the second visual information is a key frame in the video, and the performing feature extraction on each piece of modal information in the multi-modal information, so as to obtain features corresponding to each piece of modal information comprises:

performing a first text encoding operation on the text content to obtain a text feature;

performing a second text encoding operation on the first visual information to obtain a first visual feature; and performing an image encoding operation on the second visual information to obtain a second visual feature.

12. The electronic device according to claim 11, wherein the fusing the features corresponding to each piece of modal information to obtain a fused feature comprises:

performing a vector stitching operation on the features corresponding to each piece of modal information, so as to obtain a stitched vector as the fused feature.

13. The electronic device according to claim 11, wherein the labeling the keyword according to the fused feature comprises:

labeling the keyword according to the fused feature using a conditional random field.

14. The electronic device according to claim 11, wherein the acquiring background knowledge corresponding to the keyword comprises:

acquiring the background knowledge corresponding to the keyword from an existing knowledge base.

15. The electronic device according to claim 11, wherein the classifying the text to be recognized comprises:

classifying the text to be recognized using a classification model, the classification model being obtained after trained using broadcast television data.

16. A non-transitory computer readable storage medium with computer instructions stored thereon, wherein the computer instructions are used for causing a computer to perform a video classification method, wherein the video classification method comprises:

extracting a keyword in a video according to multi-modal information of the video;

acquiring background knowledge corresponding to the keyword, and determining a text to be recognized according to the keyword and the background knowledge; and classifying the text to be recognized to obtain a class of the video, wherein the extracting a keyword in a video according to multi-modal information of the video comprises:

performing feature extraction on each piece of modal information in the multi-modal information, so as to obtain features corresponding to each piece of modal information;

fusing the features corresponding to each piece of modal information to obtain a fused feature; and performing a word labeling according to the fused feature in the video to determine the keyword in the video, wherein the multi-modal information comprises text content and visual information, the visual information comprises first visual information and second visual information, the first visual information is visual information corresponding to a text in a video frame in the video, the second visual information is a key frame in the video, and the performing feature extraction on each piece of modal information in the multi-modal information, so as to obtain features corresponding to each piece of modal information comprises:

performing a first text encoding operation on the text content to obtain a text feature;

performing a second text encoding operation on the first visual information to obtain a first visual feature; and performing an image encoding operation on the second visual information to obtain a second visual feature.

* * * * *